(12) United States Patent
Colon

(10) Patent No.: US 11,989,031 B2
(45) Date of Patent: May 21, 2024

(54) METHOD AND SYSTEM FOR ASSISTING AN AUTONOMOUS MOTOR VEHICLE

(71) Applicant: VULOG, Nice (FR)

(72) Inventor: François Colon, Marseilles (FR)

(73) Assignee: VULOG, Nice (FR)

( * ) Notice: Subject to any disclaimer, the term of this patent is extended or adjusted under 35 U.S.C. 154(b) by 196 days.

(21) Appl. No.: 17/418,999

(22) PCT Filed: Dec. 24, 2019

(86) PCT No.: PCT/FR2019/053294
§ 371 (c)(1),
(2) Date: Jun. 28, 2021

(87) PCT Pub. No.: WO2020/136352
PCT Pub. Date: Jul. 2, 2020

(65) Prior Publication Data
US 2022/0091617 A1   Mar. 24, 2022

(30) Foreign Application Priority Data

Dec. 28, 2018 (FR) ...................................... 1874384

(51) Int. Cl.
*G05D 1/02* (2020.01)
*G01C 21/28* (2006.01)
*G05D 1/00* (2006.01)

(52) U.S. Cl.
CPC ......... *G05D 1/0276* (2013.01); *G05D 1/0287* (2013.01)

(58) Field of Classification Search
CPC .. G05D 1/0276; G05D 1/0287; G05D 1/0038; G05D 2201/0213; G05D 1/0027; G01C 21/28
See application file for complete search history.

(56) References Cited

U.S. PATENT DOCUMENTS

| 9,381,916 B1 | 7/2016 | Zhu et al. |
| 2015/0104071 A1* | 4/2015 | Martin ................... G08G 1/202 382/104 |

(Continued)

FOREIGN PATENT DOCUMENTS

| DE | 102013201168 A1 * | 7/2014 | ........... G05D 1/0022 |
| WO | 2016/183525 A1 | 11/2016 | |
| WO | WO-2018159314 A1 * | 9/2018 | ........... G05D 1/0027 |

OTHER PUBLICATIONS

English Translation for WO-2018159314-A1 (Year: 2018).*

(Continued)

*Primary Examiner* — Rachid Bendidi
*Assistant Examiner* — Moises Gasca Alva
(74) *Attorney, Agent, or Firm* — Maier & Maier, PLLC

(57) ABSTRACT

A method for assisting an autonomous motor vehicle includes using an autonomous motor vehicle equipped with an automatic driving device which is adapted to decide driving actions to be carried out in order to autonomously circulate on a route, connecting the automatic driving device to a computer server of a remote control center through a wireless communication network, determining the geographical position of the vehicle. The method also includes predictive detection of a critical event on the route upstream of the position of the vehicle, which results in said operator takes control of the remote vehicle and decides driving actions, predictive detection of the critical event resulting from the combined analysis of data that includes, data on the state of the traffic lanes taken on the route upstream, the road conditions, the meteorological conditions, data coming from sensors installed on the vehicle.

8 Claims, 1 Drawing Sheet

(56) References Cited

U.S. PATENT DOCUMENTS

| | | | | |
|---|---|---|---|---|
| 2016/0139594 A1* | 5/2016 | Okumura | ............ | G05D 1/0022 |
| | | | | 701/2 |
| 2017/0308082 A1 | 10/2017 | Ullrich et al. | | |
| 2018/0074490 A1* | 3/2018 | Park | ................... | G06Q 20/3224 |
| 2018/0157273 A1* | 6/2018 | Wegend | ................. | G08G 1/164 |
| 2018/0329428 A1* | 11/2018 | Nagy | ............... | G08G 1/096827 |
| 2018/0356814 A1* | 12/2018 | Brooks | ................... | B61L 27/14 |

OTHER PUBLICATIONS

English Translation for DE-102013201168-A1 (Year: 2014).*
International Search Report (with English translation) and Written Opinion (with Machine translation) dated Apr. 15, 2020 in corresponding International Application No. PCT/FR2019/053294; 14 pages.

* cited by examiner

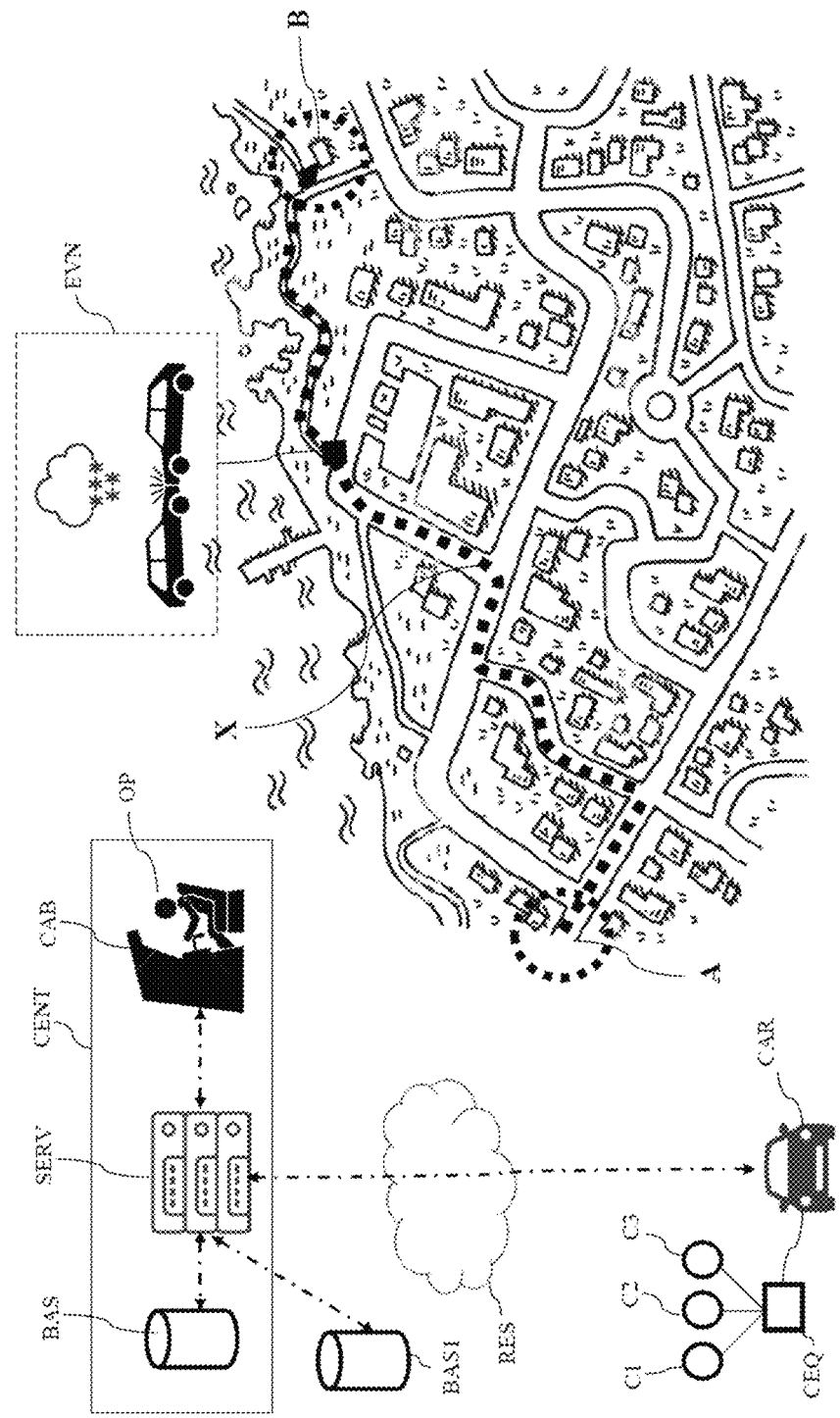

METHOD AND SYSTEM FOR ASSISTING AN AUTONOMOUS MOTOR VEHICLE

FIELD

The invention relates to a method and a system for assisting an autonomous motor vehicle.

In particular, the field of the invention relates to methods allowing momentarily taking control of an autonomous vehicle remotely, when a critical event arises on the route of said vehicle.

BACKGROUND

An autonomous motor vehicle (for example: a car or a truck) can circulate on a route, in complete autonomy, without any intervention of a driver. Thanks to an automatic driving device such as that one described in the document US 2017/308082 (ULRICH), the vehicle is capable of moving on its own and taking piloting decisions in real traffic conditions, without any human intervention. In general, this driving device is connected to a remote control center, throughout a wireless communication network. This control center allows monitoring the operation of the vehicle and interacting with the driving device where appropriate.

The automatic driving device comprises numerous sensors (lidar, radars, cameras, . . . ) and a computation software based on artificial intelligence algorithms, serving in modeling the environment of the vehicle in three dimensions and in identifying the elements that compose it (road marking, signaling, buildings, vehicles, pedestrians . . . ). Thus, the driving device can decide on piloting actions to carry out on said vehicle (steering, brake, acceleration, flashing lights, . . . ) so it could be guided while complying with traffic rules and avoiding obstacles.

With existing technologies, three-dimensional modeling of the environment of the vehicle allows identifying objects located in the immediate environment, that is to say within a few meters, of said vehicle. Thus, the automatic driving device can detect and solve unexpected situations (for example, a pedestrian who crosses a street outside a crosswalk), a few seconds before a critical event occurs (for example a collision of the vehicle with the pedestrian). The analysis and the anticipation of these unforeseen events being almost instantaneous, the possibilities of piloting actions are limited in practice (for example: emergency abrupt change in steering or braking). Furthermore, this rapid analysis may cause misinterpretations and therefore unsuited piloting actions.

An objective of the invention is to overcome the aforementioned drawbacks. Another objective of the invention is to provide a method allowing assisting an autonomous vehicle effectively when a critical event arises on its route. Still another objective of the invention is to provide a method allowing reducing the misinterpretations of a critical event and implementing, as rapidly as possible, piloting actions to optimally overcome this event.

SUMMARY

The solution provided by the invention is a method for assisting an autonomous motor vehicle comprising the following steps:
  use of an autonomous motor vehicle equipped with an automatic driving device adapted to decide on piloting actions to carry out on said vehicle in order to make said vehicle circulate autonomously on a route,
  connection of the automatic driving device to a computer server of a remote control center, which connection is carried out throughout a wireless communication network,
  determination, by the computer server, of the geographical position of the vehicle,
  the method comprises a step of predictive detection of a critical event on the route, upstream of the geographical position of the vehicle, which detection results in taking on the driving device, by an operator of the control center, so that said operator temporarily takes control of the vehicle remotely and decides on the piloting actions,
  the predictive detection of the critical event results in the combined analysis of data, by the computer server, which data include:
    data on the state of the followed traffic lanes on the route, upstream of the geographical position of the vehicle, and
    data on the traffic conditions on the route, upstream of the geographical position of the vehicle, and
    data on the meteorological conditions on the route, upstream of the geographical position of the vehicle, and optionally
    data originating from sensors installed on the vehicle.

The invention now allows predicting a critical event that will occur on the route of the autonomous vehicle (accident, traffic jam, snow, black ice, . . . ). The analysis of this event may be done well ahead of the location where it takes place, so that misinterpretations are limited and adequate piloting actions could be implemented. Furthermore, it is a human operator who momentarily takes control of the vehicle remotely and who performs these piloting actions, so that the critical event is optimally managed, with maximum safety.

Other advantageous features of the invention are listed hereinbelow. Each of these features may be considered alone or in combination with the remarkable features defined hereinabove and, where appropriate, be the object of one or several divisional patent applications:
  According to one embodiment, the method includes the following steps: —assignment of a risk level to an event detected by the computer server, the risk level being calculated while considering as input data: the data on the state of the traffic lanes, the data on the traffic conditions, the data on the meteorological conditions, the data originating from the sensors; —determining that an event is critical if the risk level assigned thereto exceeds a threshold level.
  According to one embodiment, the server assigns a value to each of the analyzed data for the predictive detection; these values may be weighted so that some of said data have a weight greater than others.
  According to one embodiment, the data originating from all or part of the sensors installed on the vehicle are used to vary weighting of the values assigned to the other data.
  According to one embodiment, the connection between the automatic driving device and the computer server, is carried out throughout a mobile phone network.
  According to one embodiment, the mobile phone network is a 5G network.
  According to one embodiment, the data on the state of the traffic lanes are gathered by the computer server: from one or several databases of one or several digital mapping and route computation sites, and/or from sensors installed on one or several other autonomous vehicle(s) circulating on traffic lanes of the route, upstream of the geographical position of the vehicle.

According to one embodiment, the data on the traffic conditions are gathered by the computer server: from one or several databases of one or several digital mapping and route computation sites on the Internet, and/or from sensors installed on one or several other autonomous vehicle(s) circulating on the route, upstream of the geographical position of the vehicle.

According to one embodiment, the data on the meteorological conditions are gathered by the computer server: from one or several databases of one or several meteorological conditions, and/or from meteorological sensors installed on other autonomous vehicles circulating on traffic lanes of the route, upstream of the geographical position of the vehicle.

According to one embodiment, the data analyzed by the computer server concern a portion of the route that is located upstream of the geographical position of the vehicle, at a distance equal to or longer than 2 km from said geographical position.

Another aspect of the invention relates to a system for assisting an autonomous motor vehicle including:
an autonomous motor vehicle equipped with an automatic driving device adapted to decide on piloting actions to carry out on said vehicle in order to make said vehicle circulate autonomously on a route,
a remote control center including a computer server connected to the automatic driving device, throughout a wireless communication network, which server comprises a means for determining the geographical position of the vehicle,
the computer server is adapted to detect, in a predictive way, a critical event on the route, upstream of the geographical position of the vehicle, which detection causes the generation of an instruction to take on the driving device, by an operator of the control center, so that said operator could temporarily take control of the vehicle remotely and decide on the piloting actions,
the predictive detection of the critical event results in the combined analysis of data, by the computer server, which data include:
data on the state of the followed traffic lanes on the route, upstream of the geographical position of the vehicle, and
data on the traffic conditions on the route, upstream of the geographical position of the vehicle, and
data on the meteorological conditions on the route, upstream of the geographical position of the vehicle, and
data originating from sensors installed on the vehicle.

BRIEF DESCRIPTION OF THE DRAWINGS

Other advantages and features of the invention will appear better upon reading the description of a following preferred embodiment, with reference to the appended drawings, provided as indicative and non-limiting examples and wherein:

FIG. 1 illustrates an embodiment of a system for the implementation of the invention.

DETAILED DESCRIPTION OF THE EMBODIMENTS

The method and the system objects of the invention involve manipulations of physical elements, in particular (electrical or magnetic) signals and digital data, adapted to be stored, transferred, combined, compared, . . . , and allowing ending with a desired result.

The invention implements one or several computer application(s) executed by computer equipment or servers. For clarity purposes, in the context of the invention, it should be understood that "a piece of equipment or server does something" means "the computer application executed by a processing unit of the equipment or of the server does something". In the same manner, "the computer application does something" means "the computer application executed by the processing unit of the equipment or of the server does something".

Still for clarity purposes, the present invention may refer to one or several "logical computer process(es)". These correspond to the actions or results obtained by the execution of instructions of different computer applications. Henceforth, in the context of the invention, it should also be understood that "a logical computer process is adapted to do something" means "the instructions of a computer application executed by a processing unit do something".

Still for clarity purposes, the following clarifications are given for some terms used in the description and the claims:

"Computer resource" may be understood, without limitation, as: component, hardware, software, file, connection to a computer network, RAM memory amount, hard disk space, bandwidth, processor speed, number of CPUs, etc.

"Computer server" may be understood, without limitation, as: computer device (hardware or software) including computer resources to carry out the functions of a server and which offers services, computer, plurality of computers, virtual server on the Internet, virtual server on the Cloud, virtual server on a platform, virtual server on a local infrastructure, networks of servers, cluster, node, bank of servers, bank of nodes, etc.

"Query" refers to an execution order which may comply with a communication protocol and comprising input parameters (question, information, . . . ) and possibly feedback parameters (answer, information, . . . ) which may be in a format specific to the used protocol.

"Processing unit" may be understood, without limitation, as: processor, multiprocessors, CPU (standing for Central Processing Unit).

"Computer hardware" represents one or several separate parts of a computer equipment and may be understood, without limitation, as hardware.

"Computer application" may be understood as: software, computer program, software, etc.

"Communication network" may be understood, without limitation, as: the Internet network, cellular network, satellite network, etc. It is a set of computer equipment connected together to exchange, whether in a secure manner or not, information and/or data according to a communication protocol (ISDN, Ethernet, ATM, IP, CLNP, TCP, HTTP, . . . ).

"Database" may be understood, without limitation, as a structured and organized set of data recorded on media accessible by computer equipment and which can be queried, read and updated. Data can be inserted therein, retrieved, modified and/or destroyed. Management and access to the database may be ensured by a set of computer applications which constitute a database management system (DBMS).

"Autonomous motor vehicle" is a motor vehicle adapted to travel on road, without any intervention of a driver.

In general, an autonomous vehicle is referred to by the terms: self-driving car, robot car, autonomous car, or driverless car. In particular, the vehicle may be a car (with a heat engine and/or an electric motor) or a truck (with a heat engine and/or an electric motor).

"Fleet" or "park" may be understood as a plurality of autonomous vehicles belonging to a company, a public agency, a cooperative, an association, a group of individuals, etc.

The use of the adjectives "upstream" and "downstream" to describe the position of an event or of an object, takes as reference the direction of progress of the autonomous vehicle along the route. An event or an object located upstream of the geographical position of a vehicle means that this event or this object is located ahead of the vehicle, between said vehicle and the point of arrival of the route. Similarly, a vehicle located downstream of the geographical position of an event or of an object means that this vehicle is located behind this geographical position, between the start point of the route and said geographical position.

In FIG. 1, the system for the implementation of the method object of the invention comprises an autonomous motor vehicle CAR and a control center CENT which is remote from said vehicle. The control center CENT includes a computer server SERV. In this instance, the geographic area serving as example of the invention is an urban area. The route of the vehicle CAR is illustrated by the dotted line.

The vehicle CAR, and in general each autonomous vehicle of the fleet, is equipped with an automatic driving device CEQ. This device CEQ is in the form of one or several onboard computer(s) comprising the computer resources for carrying out functions of the method of the invention and in particular the decisions on piloting action to be executed on the vehicle CAR in order to make it circulate autonomously on the route. In particular, the driving device CEQ controls the actuators of the vehicle CAR ensuring movement thereof (propulsion, brake, steering) as well as monitoring of auxiliary equipment (lights, flashing lights, horn, etc.). The device CEQ also includes a communication interface, for example GSM, 3G, 4G, 5G, to establish a wireless communication link with the server SERV, throughout a communication network RES.

The driving device CEQ is connected to various sensors C1, C2, C3 arranged on the vehicles CAR. These sensors C1, C2, C3 output, in real-time, data enabling the driving device CEQ to have a computer modeling of the environment surrounding the vehicle CAR and to identify the elements that compose this environment. Thus, while the vehicle CAR follows a route, the driving device CEQ could continuously adjust the piloting actions in response to the data of the sensors C1, C2, C3. As example, these sensors C1, C2, C3 consist of cameras (front, rear, lateral, panoramic, . . . ), proximity sensors, tactile sensors, movement detection sensors, distance measuring sensors such as lidars (Laser Imaging Detection And Ranging), radars, sonars, speed sensors, meteorological sensors (temperature, humidity, wind, atmospheric pressure, altitude, . . . ), external and/or internal microphones, etc.

The vehicle CAR, and in general each autonomous vehicle of the fleet, is associated to a unique identification number. The server SERV regularly updates, preferably in real-time, a database of the vehicles of the fleet. In particular, this database BAS groups together: the identifier of each vehicle and their geographical position. Other information and/or data may be grouped together in the database, where appropriate, in particular their status (for example: available or unavailable). The database BAS may be recorded in a memory area of the server SERV or be remote from said server (and remote from the control center CENT) and connected to the latter.

The geographical position of the vehicles may be obtained by satellite (GPS or Galileo system) or by a triangulation system (for example, a system using the cells of a 4G or 5G network) or by a combination of both location systems. Advantageously, the driving device CEQ includes a component, for example a GPS component, allowing obtaining geolocation information that could be gathered by the server SERV. The server SERV may automatically gather this information by querying the driving device CEQ, in real-time or at regular time intervals (for example every 5 minutes). The latter may also automatically transmit this information to the server SERV (without responding to a querying request), in real-time or at regular time intervals (for example every 5 minutes). Thus, the server SERV may determine, in a very accurate manner, the geographical position of each vehicle of the fleet and in particular that of the vehicle CAR.

In the example of FIG. 1, the route of the vehicle CAR consists of a pathway between a start point A and a point of arrival B. The pathway is planned by the driving device CEQ and transmitted to the server SERV. According to one alternative, the pathway is planned by the server SERV and transmitted to the driving device CEQ. Advantageously, the driving device CEQ (and/or the server SERV) integrates one or several digital mapping and route computation computer application(s), so that it has a thorough knowledge of the streets, traffic lanes, pedestrian walkways, located between the point A and the point B. Alternatively, the driving device CEQ (and/or the server SERV) is adapted to connect to one or several digital mapping and route computation sites on the Internet to gather this information.

In the context of the present invention, the server SERV is adapted to detect, in a predictive manner, a critical event EVN on the route, upstream of the geographical location of the vehicle CAR. In the example of FIG. 1, the server SERV detects that a traffic accident has happened between the point A and the point B and that it snows on the accident location. This detection is carried out while the vehicle CAR is at a point X of the route, which point X is located downstream of the location of the accident, for example at 2 km from the geographical location of the accident. By "predictive detection", it should be understood that the server SERV detects the event before the driving device CEQ could detect it on its own, by means of the sensors C1-C3.

The predictive detection of the critical event results in the combined analysis (that is to say a simultaneous and cross-case analysis) of data, by the server SERV. These data include:
 data on the state of the followed traffic lanes on the route, upstream of the geographical position X of the vehicle CAR, and
 data on the traffic conditions on the route, upstream of the geographical position X of the vehicle CAR, and
 data on the meteorological conditions on the route, upstream of the geographical position X of the vehicle CAR, and, possibly,
 data originating from all or part of the sensors C1-C3 installed on the vehicle CAR.

The data on the state of the traffic lanes consist of data on temporary events that affect one or several followed traffic lane(s) on the route. In particular, these consist of works, objects obstructing a traffic lane, roads or tunnels closed to traffic, etc. The data on the traffic conditions consist of data on the state of the traffic (smooth, dense, very dense) on one or several followed traffic lane(s) on the route. Advantageously, the server SERV is adapted to connect to one or several database(s) BAS1 of one or several dedicated Internet site(s), in particular digital mapping and route computation sites on the Internet (for example: https://fr.mappy.com, https://www.viamichelin.fr) to gather the data on the state of the traffic lanes and on the state of the traffic. Alternatively or complementarily, the server SERV queries the database BAS to locate one or several other autonomous vehicle(s) circulating on traffic lanes of the route, upstream of the geographical position of the vehicle CAR. Once the server SERV has identified these vehicles, it queries their driving device (that is to say it generates and emits a querying request) to gather the data of their sensors. Thus, the server SERV can analyze a three-dimensional computer modeling of the environment surrounding each of these vehicles to identify relevant elements that might characterize a critical event.

The data on the meteorological conditions consist in particular of one or more of the following data: temperature, atmospheric pressure, altitude, wind, humidity, snow, black ice. Advantageously, the server SERV is adapted to connect to one or several database(s) BAS1 of one or several dedicated Internet site(s), in particular, weather sites on the Internet (for example: http://www.v-traffic.com/meteo-routiere, http://www.meteofrance.com) to gather the data on the road weather. Alternatively or complementarily, the server SERV queries the database BAS to locate one or several other autonomous vehicle(s) circulating on traffic lanes of the route, upstream of the geographical position of the vehicle CAR. Once the server SERV has identified these vehicles, it queries their driving device CEQ (that is to say it generates and emits a querying request) to gather the data of their meteorological sensors. Thus, the server SERV can identify exceptional meteorological events that might characterize a critical event.

The data originating from all or part of the sensors C1-C3 can be used to correlate some of the previous data. For example, if a weather site indicates to the server SERV a sudden deterioration of the meteorological conditions on an area of the pathway, the server SERV could queries the meteorological sensors of the vehicle CAR to confirm this information (for example, by noticing an abrupt variation of the atmospheric pressure).

The data gathered by the server SERV are analyzed in real-time to identify a potential critical event that might compromise the safety of the vehicle CAR and of its passengers. Advantageously, the server SERV executes an algorithm for assigning a risk level to an event. Advantageously, this algorithm is based on an automatic learning (artificial intelligence) for more efficiency. The input data of this algorithm are the aforementioned data and the output data are scores or levels of risks. For example, these levels are classified on a scale from 0 to 5 with: 0=no risk; 1=very low risk; 2=low risk; 3=moderate risk; 4=high risk; 5=very high risk. According to one embodiment, the server SERV assigns a value to each of the analyzed data: if no event is reported on the traffic lanes, a zero value is assigned to the data on the state of the traffic lanes. A non-zero value will be assigned to works, another non-zero value will be assigned to an object obstructing a traffic lane, still another non-zero value will be assigned to a road or tunnel closed to traffic, etc. The same applies for the data on the traffic conditions: a zero value will be assigned to a smooth traffic, a non-zero value will be assigned to a dense traffic, a greater non-zero value will be assigned to a dense traffic, and still another greater non-zero value will be assigned to a very dense traffic. Similar values are assigned to the data on the meteorological conditions: temperature, atmospheric pressure, wind, humidity, snow, black ice. The values assigned to snowfalls or to the presence of black ice will be maximum as these are the most dangerous.

According to one embodiment, the values assigned to all of these data are weighted so that some have a weight greater than others. For example snowfalls or the presence of black ice have a weight greater than the characteristic of the traffic to the extent that the driving device CEQ will be more able to manage alone traffic conditions than exceptional meteorological events. The data originating from all or part of the sensors C1-C3 may be used to vary weighting of the values assigned to the other data. For example, if data originating from a weather site coincide with the data of the meteorological sensors of the vehicle CAR, some weighting is applied. Otherwise, another weighting will be applied. Similarly, if the server SERV detects the presence of a fire on a portion of the route, it could analyze the images transmitted by the cameras of the vehicle CAR to determine the intensity of this fire (a thick and dense cloud of smoke away from the vehicle CAR will reveal the presence of a high-intensity fire). Weighing assigned to the data on the state of the traffic lanes could be varied according to whether this fire is deemed to be of high-intensity or of low-intensity by the server SERV. The server SERV may implement other algorithms to calculate a risk level and determine whether an event is critical or not.

In the aforementioned embodiment, beyond a determined threshold level, the server SERV determines that an event is critical and cannot be safely managed by the driving device CEQ alone. And below this threshold level, the server SERV determines that an event is non-critical and can be managed by the driving device CEQ alone. For example, the server SERV may be programmed to determine that, starting from the level 4, an event is considered as critical. In the example of FIG. 1, a level of 2 or 3 would have been assigned to the mere detection of the accident between the point A and the point B. The driving device CEQ can manage this situation alone when the vehicle CAR arrives on the location of this accident. Conversely, the presence of snowfalls on the site of the accident raises the level to 4 or 5. Indeed, driving on the snow requires a particular piloting technique that the driving device CEQ cannot safely perform on its own. In this case, the server SERV initiates a specific action.

According to the invention, the detection of a critical event by the server SERV results in taking on the driving device CEQ, by an operator of the control center, so that said operator temporarily takes control of the vehicle CAR remotely and decides on the piloting actions. The control center CENT is equipped with a human interface simulating the environment of the vehicle CAR thanks to the data of the sensors C1-C3 gathered by the server SERV in real-time. The interface is configured so as to enable a total immersion of an operator OP in the place of a driver of the vehicle CAR. Thus, this human operator is capable of virtually driving the vehicle CAR.

In FIG. 1, this interface is in the form of a piloting cabin or simulator CAB. According to an advantageous embodiment, this cabin CAB is provided with one or several screen(s) replicating the visual outside the vehicle CAR and possibly a visual inside the vehicle. The cabin CAB is also provided with a "hardware set" enabling the operator OP to interact with the simulated vehicle: dashboard, seat, steering wheel, pedals (accelerator, brake, clutch), gearbox, controls (lights, flashing lights, horn, . . . ). The cabin CAB may also be provided with a sound interface capable of rendering the sounds inside and/or outside the vehicle CAR. A microphone may also be provided to communicate with the passengers of the vehicle CAR.

When the server SERV detects a critical event, it transmits to the driving device CEQ a take-on instruction. This instruction comprises data modifying the autonomous operation of the vehicle CAR. In particular, these instruction data allow momentarily preventing the driving device CEQ from deciding on the piloting actions. All piloting action instructions are now generated from the cabin CAB, and are decided by the operator OP. Thus, the latter remotely takes control of the vehicle CAR. The driving device CEQ then serves only as an interface between the cabin CAB and the actuators of the vehicles CAR ensuring movement thereof (propulsion, brake, steering) as well as the auxiliary equipment (lights, flashing lights, horn, . . . ), etc. Thus, when the operator OP drives the virtual vehicle simulated by the cabin CAB, each piloting action is instantaneously transmitted to the vehicle CAR. Returning back to the aforementioned example, the operator OP, skilled in driving on the snow, can remotely pilot the vehicle CAR to manage the passage of the rugged and snowy area.

The operator OP must be able to monitor the vehicle CAR early enough so as to be able to better anticipate the piloting actions and safely manage the passage of the critical event EVN. Indeed, should the operator OP take control of the vehicle CAR when the latter is in the immediate proximity of the critical event EVN, his piloting action possibilities would be more limited and prone to misinterpretations. Also, according to one embodiment, the data analyzed by the server SERV relate to a portion of the route that is located upstream of the geographical position of the vehicle CAR, at a distance equal to or longer than 2 km from said geographical position. In FIG. 1, the server SERV detects the critical event EVN while the vehicle CAR is located at the point X, downstream of the geographical position of the critical event EVN. The distance between the point X and the critical event EVN is equal to or longer than 2 km, advantageously longer than or equal to 5 km, so that the operator OP has all the necessary time to get acquainted with the environment of the vehicle CAR replicated in the cabin CAB and better anticipate the piloting actions.

Once the critical event EVN is overcome and left downstream of the vehicle CAR, and when the server SERV no longer detects any other critical event, said server transmits to the driving device CEQ other instruction data modifying the autonomous operation of the vehicle CAR. These other instruction data enable again the driving device CEQ to decide alone on the piloting actions.

It should be ensured that all piloting action instructions generated by the operator OP, from the cabin CAB, could be transmitted instantaneously or almost instantaneously to the driving device CEQ. Indeed, a piloting instruction that would have been received with a significant time lag by the driving device CEQ, would pose problem. Henceforth, a mobile phone network RES is preferably selected to ensure the connection between the driving device CEQ and the server SERV. Indeed, this network type has an excellent geographic coverage (the risks of white areas being considerably limited and even inexistent) and has communication rates that are high enough to rapidly transmit the piloting action instructions to the driving device CEQ. Advantageously, a 5G network that ensures an optimum communication rate is used.

The invention also relates to a computer program product including instructions for the implementation of the different steps of the method of the invention. The steps may be carried out by a computer program recorded in the memory of the server SERV and whose instructions are executed by the processing unit of said server. According to different embodiments, steps of the method may be carried out by the driving device CEQ of the vehicle CAR.

The arrangement of the different elements and/or means and/or steps of the invention, in the embodiments described hereinabove, shall not be interpreted as imposing such an arrangement in all implementations. In particular, one or several feature(s), disclosed only in one embodiment, may be combined with one or several other feature(s), disclosed only in another embodiment.

The invention claimed is:

1. A method for assisting an autonomous motor vehicle comprising:

using an autonomous motor vehicle equipped with an automatic driving device adapted to decide on piloting actions to carry out on the autonomous motor vehicle in order to make the autonomous motor vehicle travel autonomously on a route, connecting the automatic driving device to a computer server of a remote control center, which connection is carried out throughout a wireless communication network, determining, by the computer server, a geographical position of the autonomous motor vehicle, wherein:

the method comprises a step of predictive detection of a critical event on the route, upstream of the geographical position of the autonomous motor vehicle, which detection leads to the driving device being taken over by an operator at the remote control center so that said operator temporarily takes control of the autonomous motor vehicle remotely and decides on the piloting actions, the predictive detection of the critical event results in a combined analysis of data, by the computer server, which data include:

data on the state of the followed traffic lanes on the route, upstream of the geographical position of the autonomous motor vehicle, and data on the traffic conditions on the route, upstream of the geographical position of the autonomous motor vehicle, and data on the meteorological conditions on the route, upstream of the geographical position of the autonomous motor vehicle, and data originating from sensors installed on the autonomous motor vehicle, and wherein the method further comprises:

assigning a risk level to an event detected by the computer server, the risk level being calculated while considering as input data: the data on the state of the traffic lanes, the data on the traffic conditions, the data on the meteorological conditions, the data originating from the sensors, assignment, by the computer server, of a value to each of the input data, weighting of the values assigned to the input data so that some of said data have a weight greater than others, the data originating from all or part of the sensors installed on the autonomous motor vehicle being used to vary weighting of the values assigned to the other input data, the other input data comprising at least one of traffic lane data, traffic condition data, and meteorological condition data, and determining that an event is critical if the risk level assigned thereto exceeds a threshold level and transmitting a take-on instruction that modifies operation of the vehicle.

2. The method according to claim 1, wherein the connection between the automatic driving device and the computer server is carried out throughout a mobile phone network.

3. The method according to claim 2, wherein the mobile phone network is a 5G network.

4. The method according to claim 1, wherein the data on the state of the traffic lanes are gathered by the computer server:
from one or several databases of one or several digital mapping and route computation sites, and/or
from sensors installed on one or several other autonomous vehicle(s) circulating on traffic lanes of the route, upstream of the geographical position of the autonomous motor vehicle.

5. The method according to claim 1, wherein the data on the traffic conditions are gathered by the computer server:
from one or several databases of one or several digital mapping and route computation sites on the Internet, and/or
from sensors installed on one or several other autonomous vehicle(s) circulating on the route, upstream of the geographical position of the autonomous motor vehicle.

6. The method according to claim 1, wherein the data on the meteorological conditions are gathered by the computer server:
from one or several databases of one or several meteorological conditions, and/or
from meteorological sensors installed on other autonomous vehicles circulating on traffic lanes of the route, upstream of the geographical position of the autonomous motor vehicle.

7. The method according to claim 1, wherein the data analyzed by the computer server concern a portion of the route that is located upstream of the geographical position of the autonomous motor vehicle, at a distance equal to or longer than 2 km from said geographical position.

8. A system for assisting an autonomous motor vehicle including:
an autonomous motor vehicle equipped with an automatic driving device adapted to decide on piloting actions to carry out on the autonomous motor vehicle in order to make the autonomous motor vehicle travel autonomously on a route,
a remote control center including a computer server connected to the automatic driving device, throughout a wireless communication network, which computer server comprises a means for determining a geographical position of the autonomous motor vehicle,
wherein:
the computer server is adapted to detect, in a predictive way, a critical event on the route, upstream of the geographical position of the autonomous motor vehicle, which detection leads to the driving device being taken over by an operator at the remote control center so that said operator could temporarily take control of the autonomous motor vehicle remotely and decide on the piloting actions,
the predictive detection of the critical event results in a combined analysis of data, by the computer server, which data include:
data on the state of the followed traffic lanes on the route, upstream of the geographical position of the autonomous motor vehicle, and
data on the traffic conditions on the route, upstream of the geographical position of the autonomous motor vehicle, and
data on the meteorological conditions on the route, upstream of the geographical position of the autonomous motor vehicle, and
data originating from sensors installed on the autonomous motor vehicle, the data originating from all or part of said sensors being used to vary weighting of the values assigned to the other said data,
and wherein:
a risk level is assigned to an event detected by the computer server, the risk level being calculated while considering as input data: the data on the state of the traffic lanes, the data on the traffic conditions, the data on the meteorological conditions, the data originating from the sensors,
the computer server assigns a value to each of the input data, the values assigned to the input data being weighed so that some of said data have a weight greater than others, the data originating from all or part of the sensors installed on the autonomous motor vehicle being used to vary weighting of the values assigned to the other input data, the other input data comprising at least one of traffic lane data, traffic condition data, and meteorological condition data, and
the computer server determines that an event is critical if the risk level assigned thereto exceeds a threshold level and transmitting a take-on instruction that modifies operation of the vehicle.

* * * * *